United States Patent
Fukuda

[11] Patent Number: 6,091,711
[45] Date of Patent: Jul. 18, 2000

[54] MULTIPLEX COMMUNICATION METHOD AND MULTIPLEX COMMUNICATION APPARATUS

[75] Inventor: Masahiro Fukuda, Saitama, Japan

[73] Assignee: Kansei Corporation, Tokyo, Japan

[21] Appl. No.: 08/862,241

[22] Filed: May 23, 1997

[30] Foreign Application Priority Data

May 24, 1996 [JP] Japan .................................. 8-130444
Mar. 18, 1997 [JP] Japan .................................. 9-065193

[51] Int. Cl.[7] .............................. H04J 3/14; G06F 11/00
[52] U.S. Cl. .......................................... 370/242; 714/822
[58] Field of Search ................................... 370/470, 472, 370/476, 499, 511, 535, 241, 242, 243, 244, 245; 371/30, 36, 49.1, 69.1

[56] References Cited

U.S. PATENT DOCUMENTS

| | | | |
|---|---|---|---|
| 3,732,541 | 5/1973 | Neubauer | 371/69.1 |
| 4,070,648 | 1/1978 | Mergenthaler et al. | 395/182.16 |
| 4,456,997 | 6/1984 | Spitza | 371/68.2 |
| 4,541,095 | 9/1985 | Vries | 371/69.1 |
| 4,959,836 | 9/1990 | Berard et al. | 371/69.1 |
| 5,666,381 | 9/1997 | Mokuko | 375/259 |

FOREIGN PATENT DOCUMENTS 7-198748  8/1995  Japan ............................ G01P 15/135

Primary Examiner—Chau Nguyen
Assistant Examiner—Soon-Dong Hyun
Attorney, Agent, or Firm—Sughrue, Mion, Zinn, Macpeak & Seas, PLLC

[57] ABSTRACT

In a multiplex communication method for implementing multiplex communication between a plurality of circuit units, a format of a transmitted data signal not only is formed of serial data consisting of first data, second data that has the same content as the first data, and a parity that indicates the number of logical 1s or logical 0s forming the first data and the second data is even or odd, but also selects as regular data in such a manner that when the transmitted data signal is received, if the first data and the second data are compared with each other and judged to be coincident with each other from the comparison, then the coincident data is selected as the regular data and that if the first data and the second data are judged to be different from each other from the comparison, then a logic of the parity is checked and either the first data or the second data corresponding to the logic of the parity is selected as the regular data.

5 Claims, 2 Drawing Sheets

MULTIPLEX COMMUNICATION METHOD AND MULTIPLEX COMMUNICATION APPARATUS

BACKGROUND OF THE INVENTION

1. Field of the Invention

The present invention relates to a multiplex communication method for implementing communication, e.g., between a plurality of devices mounted on a vehicle as well as to a multiplex communication apparatus to which the multiplex communication method is applied.

2. Description of the Related Art

A conventional method and apparatus will be described taking a passenger protector shown in FIG. 3 as an example. This example is characterized as including a front passenger protector (first circuit unit) 14 that has the function of protecting passengers from a frontal crash and a side passenger protector (second circuit unit) 15 that has the function of protecting passengers from a sideward collision.

In FIG. 3, a booster circuit 3 boosts an input voltage from a battery 1 supplied through an ignition switch 2 and charges a back-up capacitor 5 through a resistor 4. The electric charges stored in the back-up capacitor 5 is discharged to a detonator 8 and a mechanical acceleration switch 9 (turned on at this time) in series through a discharge diode 6 by a microcomputer 11 turning a switch circuit 7 on upon judgment that a grave collision has occurred from an acceleration signal applied from a lengthwise acceleration sensor 10. As a result, a not shown explosive is ignited by the detonator 8 and air bags are expanded. It may be noted that the mechanical acceleration switch 9 is of such a structure as disclosed in Japanese Patent Application No. Hei. 5-351470 by the present applicant.

Further, the microcomputer 11 has a troubleshooting function. When making a capacitance diagnosis on the back-up capacitor 5, the microcomputer 11 turns a transistor 13 on to discharge the electric charges stored in the back-up capacitor 5 through a resistor 12, and reads an amount of change (per unit time) of the discharge voltage of the back-up capacitor 5 at this time. This is how the microcomputer 11 performs the capacitance diagnosing operation. When the microcomputer 11 judges that there exists an abnormality, the microcomputer 11 informs passengers of the abnormality using a not shown alarm unit such as a lamp.

The side passenger protector 15 will be described next.

That is, in FIG. 3, the side passenger protector (the one on the right out of those shown by the broken lines in FIG. 3, and this protector is also called a side air bag) 15 has a power supply fed thereto while connected to the back-up capacitor 5 of the main passenger protector 14 by a power supply line such as a wiring harness shown by reference numeral 16.

The side passenger protector 15 is mounted on or close to a door of a vehicle. Reference numeral 10' denotes a widthwise acceleration sensor, which is the same as the lengthwise acceleration sensor 10. The widthwise acceleration sensor 10' is mounted on the vehicle in a different direction so that acceleration applied across the width of the vehicle can be detected.

Reference numeral 11' denotes a microcomputer that has a collision judging function equivalent to that of the microcomputer 11. When the microcomputer 11' judges that a grave collision has occurred based on an acceleration signal outputted from a widthwise acceleration sensor 10' derived from a sideward collision, the microcomputer 11' controls a switch circuit 7' to be turned on. It may be noted that reference numeral 8' denotes a detonator equivalent to the detonator 8; 9', a mechanical acceleration switch equivalent to the mechanical acceleration switch 9; 17, a constant voltage circuit. The constant voltage circuit 17 is designed to apply a predetermined voltage to various circuits constituting the side passenger protector 15 in response to an output from the booster circuit 3 (or the back-up capacitor 5) through the power supply line 16.

That is, the microcomputer 11 of the front passenger protector 14 controls the transistor 13 to be kept turned on for a predetermined period of time when the ignition switch 2 has been turned on, and diagnoses the capacitance of the back-up capacitor 5. When the capacitance of the back-up capacitor 5 is judged to be abnormal, the microcomputer 11 causes the not shown alarm unit to issue an alarm, whereas when the capacitance of the back-up capacitor 5 is judged to be normal, the microcomputer 11 receives a detected output from the front side acceleration sensor 10 and judges whether or not a collision has occurred. If it is judged that a grave collision has occurred, the microcomputer 11 controls the switch circuit 7 to be kept turned on for a predetermined period of time, and discharges the electric charges stored in the back-up capacitor 5 to the detonator 8 to thereby expand the air bags and the like.

Further, the side passenger protector 15 not only receives a boosted voltage from the booster circuit 3 of the front passenger protector 14 through the power supply line 16, but also causes the widthwise acceleration sensor 10' to detect acceleration attributable to a sideward collision. When the microcomputer 11' judges that a grave accident has occurred from the detected signal from the sensor 10', the microcomputer 11' controls the switch circuit 7' to be kept turned on, causes power stored in the back-up capacitor 5 of the front passenger protector 14 to flow to the detonator 8' and the acceleration switch 9' in series, and ignites the explosive to thereby expand the air bags. It may be noted that both switches 7, 7' are never turned on simultaneously in ordinary cases.

Thus, in the conventional example, both the front passenger protector 14 and the side passenger protector 15 share only the power supply in common and process signals at separate circuits; i.e., their signals are not intercommunicated, which has imposed the problem of high cost.

SUMMARY OF THE INVENTION

The present invention has been made in view of the aforementioned circumstances. The object of the present invention is therefore to provide a method and apparatus in which not only circuits are shared in common by both front and side passenger protectors while allowing both protectors to implement multiplex communication but also the format of a data signal used in such method and apparatus is highly reliable.

A first aspect of the invention is applied to a multiplex communication method for implementing multiplex communication between a plurality of circuit units, in which a format of a transmitted data signal not only is formed of serial data consisting of first data, second data, and a parity, the second data having the same content as the first data, the parity indicating that a number of logical 1s or logical 0s forming the first data and the second data is even or odd, but also selects regular data in such a manner that when the transmitted data signal is received, if the first data and the second data are compared with each other and judged to be coincident with each other from the comparison, then the coincident data is selected as the regular data without checking the logic of the parity data and that if the first data and the second data are judged to be different from each other from the comparison, then a logic of the parity is checked and either the first data or the second data corresponding to the logic of the parity is selected as the regular data.

A second aspect of the invention is applied to a multiplex communication apparatus connecting a plurality of circuit units by means of a multiplex communication system, in which each of the circuit units includes: a first circuit means for preparing and outputting serial data consisting of first data, second data, and a parity, the second data having the same content as the first data, the parity indicating that a number of logical is or logical 0s forming the first data and the second data is even or odd; and a second circuit means for selecting regular data in such a manner that when the transmitted data signal is received, if the first data and the second data are compared with each other and judged to be coincident with each other from the comparison, then the coincident data is selected as the regular data and that if the first data and the second data are judged to be different from each other from the comparison, then a logic of the parity is checked and either the first data or the second data corresponding to the logic of the parity is selected as the regular data.

The above and other objects and features of the present invention will be more apparent from the following description taken in conjunction with the accompanying drawings.

DETAILED DESCRIPTION OF THE PREFERRED EMBODIMENTS

Hereinafter, a description will be given in more detail of preferred embodiments of the present invention with reference to the accompanying drawings.

Figure 1:
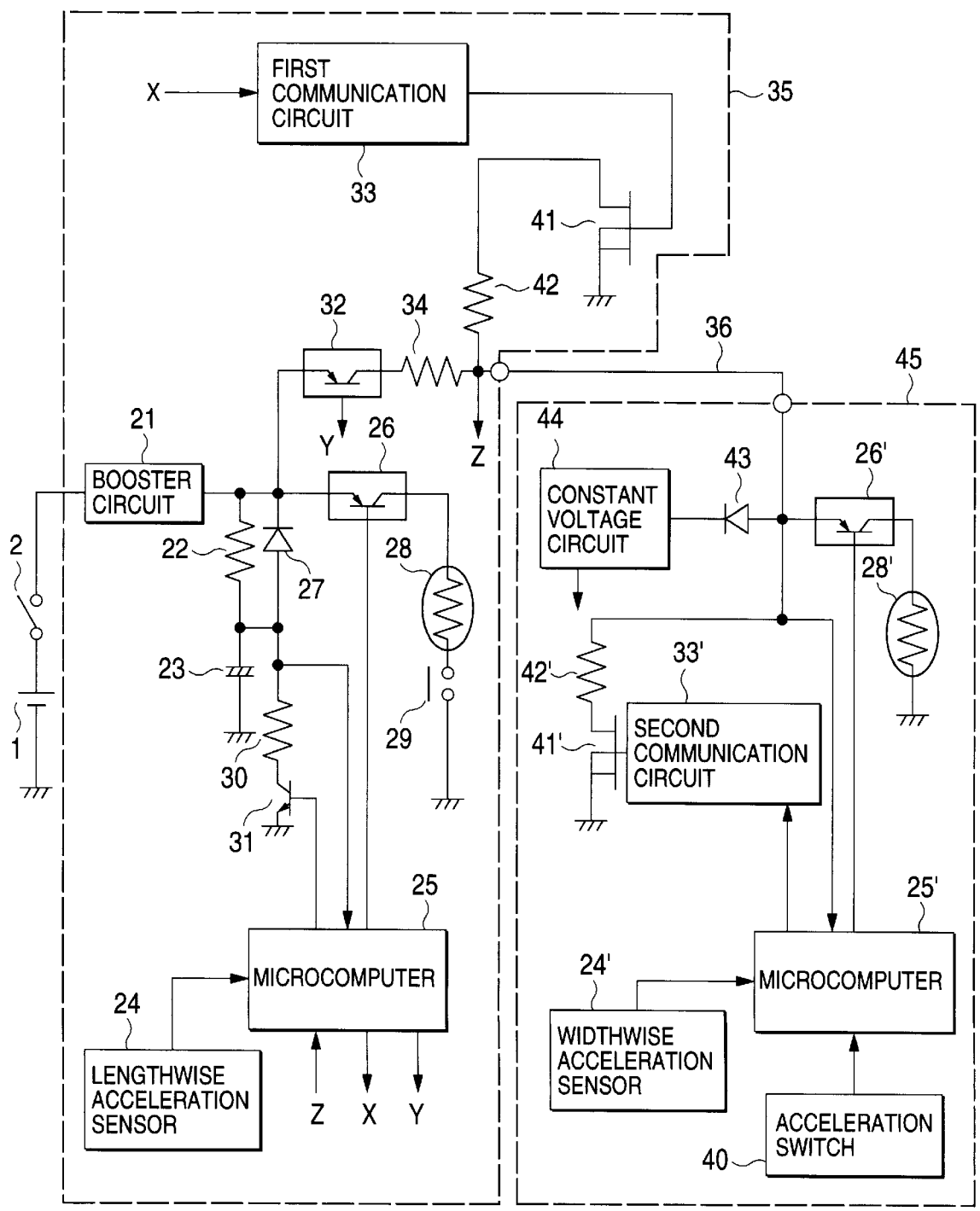
FIG. 1 is a circuit block diagram illustrative of a passenger protector according to an embodiment of the present invention.

An embodiment of the present invention will now be described with reference to FIG. 1.

A front passenger protector 35 will be described first.

That is, reference numeral 21 denotes a booster circuit, which not only charges a back-up capacitor 23 through a resistor 22 by boosting an input voltage from a battery 1 that is supplied through an ignition switch 2, but also applies the boosted voltage to a side passenger protector 45 through a switch circuit 32 and a resistor 34 in series. Reference numeral 24 denotes a lengthwise acceleration sensor that detects acceleration produced along the length of a vehicle. An acceleration signal that is a detected signal of the sensor 24 is applied to a microcomputer 25, which will be described later. This microcomputer 25 has a collision judging function. Judging from the acceleration signal applied from the lengthwise acceleration sensor 24 that a grave collision has occurred, the microcomputer 25 turns on a switch circuit 26, so that the electric charges stored in the back-up capacitor 23 is discharged through a discharge diode 27 and an ignition current is caused to flow to a squib 28 and a mechanical acceleration switch 29 in series.

Moreover, the microcomputer 25 has a troubleshooting function for the back-up capacitor 23, the squib 28, and the like. For diagnosing the capacitance of the back-up capacitor 23, the microcomputer 25 turns the switch circuit 32 off through a signal line Y immediately after turning the power switch on, so that the output current of the booster circuit 21 will not flow into a constant voltage circuit 44 to be described later, i.e., into an incorporated smoothing capacitor (not shown) and so that the electric charges stored in the back-up capacitor 23 will not be discharged as a dark current of various circuits of the side passenger protector 45. The microcomputer 25 thereafter turns a switching transistor 31 on, so that the electric charges stored in the back-up capacitor 23 is discharged through a resistor 30. Simultaneously therewith, the microcomputer 25 reads the amount of change of the discharge voltage of the back-up capacitor 23 for a predetermined time and calculates the static capacitance. This is how the microcomputer 25 performs the capacitance diagnosing operation. When the microcomputer 25 judges that there exists an abnormality, the microcomputer 25 informs passengers of the abnormality using a not shown alarm unit such as a lamp.

It may be noted that wire breakage or the like of the squib 28 is judged by the microcomputer 25 from the voltage across the squib 28 and that when it is judged that there exists a wire breakage or the like, the microcomputer 25 similarly informs the passengers of such abnormality using the not shown alarm unit such as a lamp. Further, while the microcomputer 25 makes diagnoses similar to the above by receiving various types of diagnostic signals to be described later from the side passenger protector 45 through a signal line Z, it goes without saying that such various types of diagnostic signals are transmitted from a microcomputer 25' after a first communication circuit 33 has sent a request signal to the side passenger protector 45 through a signal line X at the same time. Further, reference numeral 34 in FIG. 1 denotes the resistor inserted on the side of the front passenger protector 35 of a power supply line 36.

A format of a signal carrying the transfer data will be described next. This format is designed to reliably obtain correct data when a signal carrying the transfer data is deformed by noise or the like before the signal is received.

That is, a signal carrying the transfer data consists of 5 bits including 2-bit first data, 2-bit second data that is the same as the first data, and a 1-bit parity. The first data and the second data are the same and are coded, respectively. The content of each data indicates an abnormality or the like. For example, the data indicating that the sensor of the side passenger protector 45 is normal is "00" and the data indicating that the sensor is abnormal is "11". The data instructing collision judgment calculation start is "01", and the data requesting side air bag expansion is "10". Regular data is transmitted for each transfer data. That is, a code "00000" (the regular code of state 1) indicates that a satellite air bag is normal; a code "11110" (the regular code of state 2) indicates that the satellite air bag is abnormal; a code "01011" (the regular code of state 3) instructs collision judgment calculation start; and a code "10101" (the regular code of state 4) requests side air bag expansion. Further, the parity is set to logical 1 when the number of logical 1s forming the first data (or the second data) is odd, and set to logical 0 when the number of logical 1s forming the first data (or the second data) is even. The following will give a detailed description. It may be noted that Table 1 presents how combinations of 0, 1 including data forming combinations of 0, 1 are interpreted and that the detailed description will be based on Table 1.

TABLE 1

| Data 1 | | Data 2 | | | | |
|---|---|---|---|---|---|---|
| Bit | Bit | Bit | Bit | Parity | State | Remarks |
| 0 | 0 | 0 | 0 | 0 | State 1 | Regular code |
| 0 | 0 | 0 | 0 | 1 | State 1 | |
| 0 | 0 | 0 | 1 | 0 | State 1 | |
| 0 | 0 | 0 | 1 | 1 | State 3 | |
| 0 | 0 | 1 | 0 | 0 | State 1 | |
| 0 | 0 | 1 | 0 | 1 | State 4 | |
| 0 | 0 | 1 | 1 | 0 | Data error | Data cancel |
| 0 | 0 | 1 | 1 | 1 | Data error | Data cancel |
| 0 | 1 | 0 | 0 | 0 | State 1 | |
| 0 | 1 | 0 | 0 | 1 | State 3 | |
| 0 | 1 | 0 | 1 | 0 | State 3 | |
| 0 | 1 | 0 | 1 | 1 | State 3 | Regular code |
| 0 | 1 | 1 | 0 | 0 | Data error | Data cancel |
| 0 | 1 | 1 | 0 | 1 | Data error | Data cancel |
| 0 | 1 | 1 | 1 | 0 | State 2 | |
| 0 | 1 | 1 | 1 | 1 | State 3 | |
| 1 | 0 | 0 | 0 | 0 | State 1 | |
| 1 | 0 | 0 | 0 | 1 | State 4 | |
| 1 | 0 | 0 | 1 | 0 | Data error | Data cancel |
| 1 | 0 | 0 | 1 | 1 | Data error | Data cancel |
| 1 | 0 | 1 | 0 | 0 | State 4 | |
| 1 | 0 | 1 | 0 | 1 | State 4 | Regular code |
| 1 | 0 | 1 | 1 | 0 | State 2 | |
| 1 | 0 | 1 | 1 | 1 | State 4 | |
| 1 | 1 | 0 | 0 | 0 | Data error | Data cancel |
| 1 | 1 | 0 | 0 | 1 | Data error | Data cancel |
| 1 | 1 | 0 | 1 | 0 | State 2 | |
| 1 | 1 | 0 | 1 | 1 | State 3 | |
| 1 | 1 | 1 | 0 | 0 | State 2 | |
| 1 | 1 | 1 | 0 | 1 | State 4 | |
| 1 | 1 | 1 | 1 | 0 | State 2 | Regular code |
| 1 | 1 | 1 | 1 | 1 | State 2 | |

(1) Transfer of Regular Code of State 1 "00000"
  (a) The first data is "00"; the second data is "00"; and the parity is "0". Since the first data and the second data are coincident with each other, the coincident data "00" is defined as the regular data.
  (b) The first data is "00"; the second data is "00"; and the parity is "1". Since the first data and the second data are coincident with each other, the coincident data "00" is defined as the regular data.
  (c) The first data is "00"; the second data is "01"; and the parity is "0". Since the first data and the second data are not coincident with each other and the parity indicates that the number of 1s in the data is even, the first data "00" is selected as the regular data.
  (d) The first data is "00"; the second data is "10"; and the parity is "0". Since the first data and the second data are not coincident with each other and the parity indicates that the number of 1s in the data is even, the first data "00" is selected as the regular data.
  (e) The first data is "01"; the second data is "00"; and the parity is "0". Since the first data and the second data are not coincident with each other and the parity indicates that the number of 1s in the data is even, the second data "00" is selected as the regular data.
  (f) The first data is "10"; the second data is "00"; and the parity is "0". Since the first data and the second data are not coincident with each other and the parity indicates that the number of 1s in the data is even, the second data "00" is selected as the regular data.
(2) Transfer of Regular Code of State 2 "11110"
  (a) The first data is "11"; the second data is "11"; and the parity is "0". Since the first data and the second data are coincident with each other, the coincident data "11" is defined as the regular data.
  (b) The first data is "11"; the second data is "11"; and the parity is "1". Since the first data and the second data are coincident with each other, the coincident data "11" is defined as the regular data.
  (c) The first data is "11"; the second data is "10"; and the parity is "0". Since the first data and the second data are not coincident with each other and the parity indicates that the number of 1s in the data is even, the first data "11" is selected as the regular data.
  (d) The first data is "11"; the second data is "00"; and the parity is "0". Since the first data and the second data are not coincident with each other and the parity indicates that the number of 1s in the data is even, the first data "11" is selected as the regular data.
  (e) The first data is "10"; the second data is "11"; and the parity is "0". Since the first data and the second data are not coincident with each other and the parity indicates that the number of 1s in the data is even, the second data "11" is selected as the regular data.
  (f) The first data is "01"; the second data is "11"; and the parity is "0". Since the first data and the second data are not coincident with each other and the parity indicates that the number of 1s in the data is even, the second data "11" is selected as the regular data.
(3) Transfer of Regular Code of State 3 "01011"
  (a) The first data is "01"; the second data is "01"; and the parity is "0". Since the first data and the second data are coincident with each other, the coincident data "01" is defined as the regular data.
  (b) The first data is "01"; the second data is "01"; and the parity is "1". Since the first data and the second data are coincident with each other, the coincident data "01" is defined as the regular data.
  (c) The first data is "01"; the second data is "00"; and the parity is "1". Since the first data and the second data are not coincident with each other and the parity indicates that the number of 1s in the data is odd, the first data "01" is selected as the regular data.
  (d) The first data is "00"; the second data is "01"; and the parity is "1". Since the first data and the second data are not coincident with each other and the parity indicates that the number of 1s in the data is odd, the second data "01" is selected as the regular data.
  (e) The first data is "11"; the second data is "01"; and the parity is "1". Since the first data and the second data are not coincident with each other and the parity indicates that the number of 1s in the data is odd, the second data "01" is selected as the regular data.
  (f) The first data is "01"; the second data is "11"; and the parity is "1". Since the first data and the second data are not coincident with each other and the parity indicates that the number of 1s in the data is odd, the first data "01" is selected as the regular data.
(4) Transfer of Regular Code of State 4 "10101"
  (a) The first data is "10"; the second data is "10"; and the parity is "1". Since the first data and the second data are coincident with each other, the coincident data "10" is defined as the regular data.
  (b) The first data is "10"; the second data is "10"; and the parity is "0". Since the first data and the second data are coincident with each other, the coincident data "10" is defined as the regular data.
  (c) The first data is "10"; the second data is "11"; and the parity is "1". Since the first data and the second data are not coincident with each other and the parity indicates that the number of 1s in the data is odd, the first data "10" is selected as the regular data.

(d) The first data is "10"; the second data is "00"; and the parity is "1". Since the first data and the second data are not coincident with each other and the parity indicates that the number of 1s in the data is odd, the first data "10" is selected as the regular data.

(e) The first data is "00"; the second data is "10"; and the parity is "1". Since the first data and the second data are not coincident with each other and the parity indicates that the number of 1s in the data is odd, the second data "10" is selected as the regular data.

(f) The first data is "11"; the second data is "10"; and the parity is "1". Since the first data and the second data are not coincident with each other and the parity indicates that the number of 1s in the data is odd, the second data "10" is selected as the regular data.

(5) In the case where the first data and the second data are not coincident with each other and neither the first data nor the second data can be selected as the regular data based on the parity, e.g., the received data is "00110", "00111", "01100", "01101", "10010", "10011", "11000", or "11001", then the received data is destroyed.

When the data is obtained as a result of the above operation, the microcomputer 25 operates based on such obtained data. That is, the microcomputer 25 operates the not shown alarm unit to inform the user and the repairman of the abnormality in accordance with the code of the data.

The side passenger protector 45 will be described next.

Reference numeral 24' denotes an acceleration sensor that is the same as the lengthwise acceleration sensor. Unlike the lengthwise acceleration sensor, this acceleration sensor 24' is mounted so that acceleration across the width of the vehicle is detected. An acceleration signal, which is a detected signal of the sensor 24', is delivered to the microcomputer 25'. The microcomputer 25' has, similarly to the microcomputer 25, the collision judging function, and judges the scale of a sideward collision of the vehicle based on the acceleration signal applied from the widthwise acceleration sensor 24' and a switch signal applied from an acceleration switch 40 to be described later. When the microcomputer 25' judges that the collision is of a large scale, the microcomputer 25' controls a switch circuit 26' to be turned on and causes the back-up capacitor 23 of the front passenger protector 35 to supply an ignition current to a squib 28'.

Furthermore, the microcomputer 25' has, similarly to the microcomputer 25, the diagnostic function. The microcomputer 25' makes a diagnosis on wire breakage or the like of the squib 28' or the like, and supplies the data signal indicating the result of the diagnosis to the microcomputer 25 of the front passenger protector 35 through a second communication circuit 33' (the same type of the first communication circuit 33), the power supply line 36, and the signal line Z based on a request signal from the first communication circuit 33. It may be noted that the acceleration switch 40 includes a semiconductor acceleration sensor and a comparing circuit, and generates a switch signal when the output of the semiconductor acceleration sensor exceeds a reference value of the comparing circuit.

Reference numeral 41' denotes a switching transistor constructed of a field-effect transistor, and is subjected to on/off control by output signals from the second communication circuit 33'. Reference numeral 42' denotes a resistor interposed between the switching transistor 41' and the power supply line 36. The resistor 42' is connected to the resistor 34 in series with each other through the power supply line 36. This resistor 42' is designed to feed an input voltage to the constant voltage circuit 44 to be described later at all times with the voltage thereof on the anode side of a reverse flow preventing diode 43 held at a predetermined value other than zero when the switching transistor 41' has been turned on (or when the switching transistor 41 connected to the output side of the first communication circuit 33 has been turned on). It may be noted that the constant voltage circuit 44 supplies power to the respective circuits constituting the side passenger protector 45 in response to the input voltage at all times through the reverse flow preventing diode 43.

Figure 2:
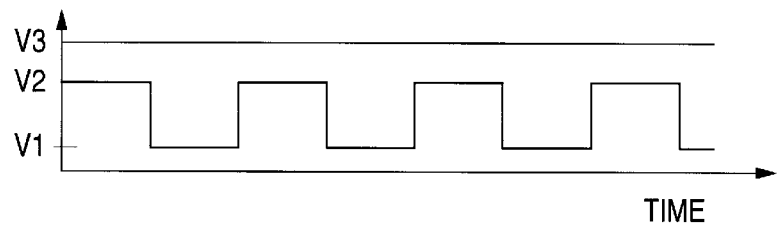
FIG. 2 is a waveform diagram of a power supply line 36 shown in FIG. 1.
Figure 3:
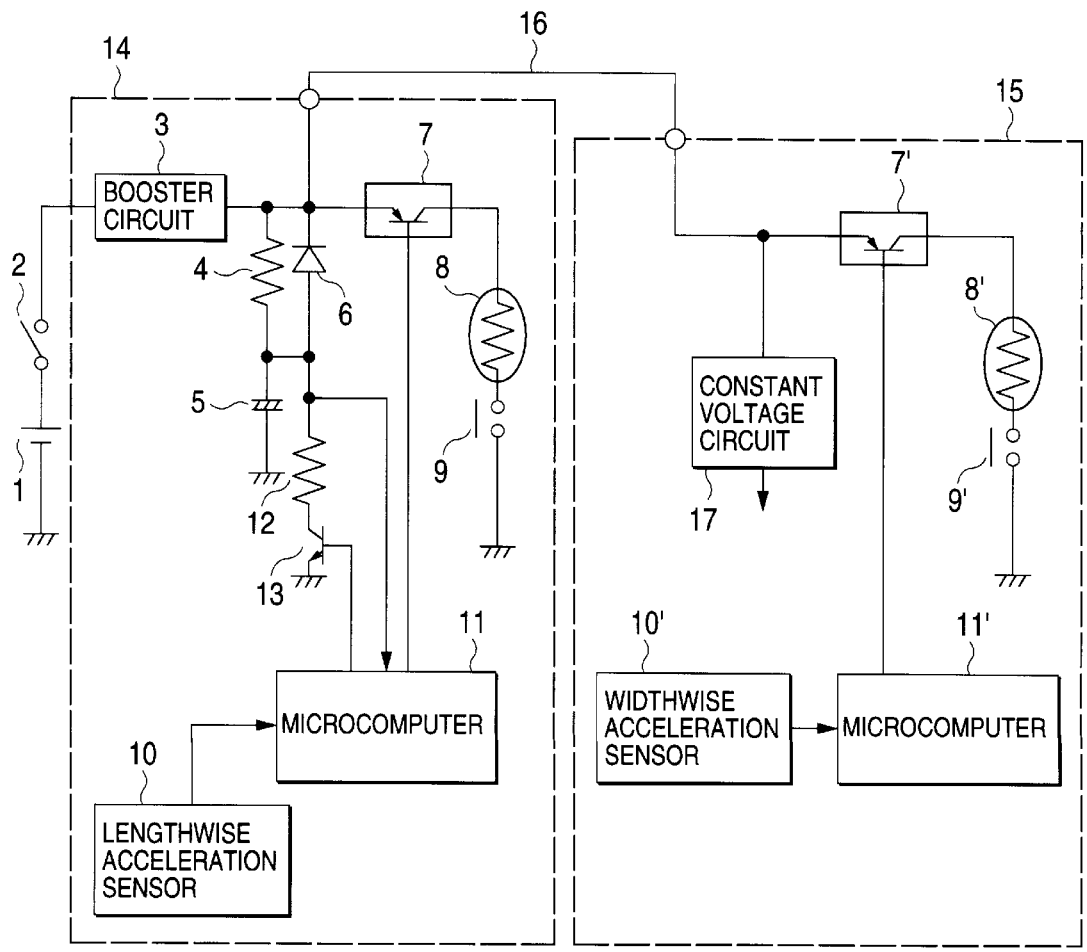
FIG. 3 is a circuit diagram illustrative of a conventional example of the present invention.

It may be noted that the waveforms of voltages from the power supply line 36 are as shown in FIG. 2 when the front passenger protector 35 communicates with the side passenger protector 45.

That is, as shown in FIG. 2, a voltage V1 is equal to a value obtained by dividing an output voltage V3 of the booster circuit 21 by the resistors 34 and 42 (or 42') when the switching transistor 41 (or 41') has been turned on, and a voltage V2 is a value obtained when the switching transistor 41 (or 41') has been turned off and is determined by the resistor 34.

An operation of the thus constructed protectors will be described next.

(1) When the Diagnostic Function is Put in Operation

When the ignition switch 2 has been turned on, not only the booster circuit 21 is activated to cause the back-up capacitor 23 to start charging but also the microcomputer 25 is activated to apply a high level signal to the switch circuit 32 through the signal line Y for a predetermined time. As a result of this microcomputer operation, the front passenger protector 35 is disconnected from the side passenger protector 45 so that only the front passenger protector 35 can make a static capacitance diagnosis on the back-up capacitor 23.

That is, the microcomputer 25 turns on the switching transistor 31 only for a predetermined time period after the back-up capacitor 23 has been fully charged, discharges the electric charges stored in the back-up capacitor 23 through the resistor 30 and the switching transistor 31 in series, and judges whether or not the back-up capacitor 23 is satisfactory by detecting the terminal voltage of the back-up capacitor 23 at this time.

The microcomputer 25 thereafter diagnoses various parts of the front passenger protector 35, e.g., wire breakage and short-circuit of the squib 28, and upon completion of such diagnosis, turns on the switch circuit 32 not only to start feeding to the side passenger protector 45 but also to apply a diagnosis request signal to the microcomputer 25' of the side passenger protector 45 through the first communication circuit 33 and the power supply line 36. In reception of the diagnosis request signal, the microcomputer 25' diagnoses various parts of the side passenger protector 45 by reading the terminal voltage of, e.g., the squib 28' and causing the switching transistor 41 to be turned on and off by the output of the second communication circuit 33'. In other words, the microcomputer 25' causes the microcomputer 25 of the front passenger protector 35 to make a diagnosis by sending signals to the microcomputer 25 through the signal line Z by means of multiplex communication implemented through the power supply line 36. That is, abnormality data is obtained through the aforementioned judgment and is outputted to the not shown alarm unit.

(2) When the Collision Judgment Function is Put in Operation

When a vehicle has undergone a frontal crash after the aforementioned various diagnoses have been completed (or while no diagnosis is being made), the mechanical acceleration switch 29 of the front passenger protector 35 turns on. When the microcomputer 25 judges that a serious collision has occurred based on an acceleration signal from the lengthwise acceleration sensor 24, the microcomputer 25 controls the switch circuit 26 to be turned on so as to apply the electric charges stored in the back-up capacitor 23 to the squib 28 through the discharge diode 27, so that the air bags and the like are expanded to protect the passengers from the frontal crash. However, since the acceleration is applied along the length of the vehicle, no signals are outputted from the widthwise acceleration sensor 24' and the acceleration switch 40 of the side passenger protector 45. As a result, no ignition current is supplied to the squib 28' from the back-up capacitor 23.

Further, when the vehicle has a collision from sideward, the mechanical acceleration switch 29 of the front passenger protector 35 does not turn on, nor is a large acceleration signal, which is equivalent to the acceleration signal applied at the time of the frontal crash, outputted from the lengthwise acceleration sensor 24. As a result, no ignition current is supplied to the squib 28.

On the other hand, when the microcomputer 25' of the side passenger protector 45 judges that a grave collision has occurred based on a switch signal from the acceleration switch 40 and an acceleration signal from the widthwise acceleration sensor 24', the microcomputer 25' controls the switch circuit 26' to be turned on so as to supply the electric charges stored in the back-up capacitor 23 to the squib 28' through the power supply line 36. As a result, the air bags are expanded to protect the passengers from the sideward collision.

In the above embodiment, the resistor 34 may be replaced by a current mirror circuit.

As described above, a regular data judgment is made by comparing the first data with the second data. In addition, each of the first data and the second data consists of two bits and is simply formatted. Therefore, compared with the technique in which a regular data judgment is made by a majority method involving three or more pieces of data, the method according to this embodiment is advantageous in making a regular data judgment within a short period of time. Further, the parity check is only available in making a compatibility judgment on the data corresponding to a parity to be checked. Therefore, when a parity error has occurred, data can be recovered by error correction quickly and simply.

As described in the foregoing description, according to the present invention, data processing can be executed within a short period of time, and reliability of data can also be improved. Therefore, when urgency is required such as in a collision, performance of the judging function can be improved. In addition, the present invention can provide an inexpensive multiplex communication method and apparatus, and correct data can be obtained even if data is deformed.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A multiplex communication method for implementing multiplex communication between a plurality of circuit units, said method comprising the steps of:

forming, as a format of a transmitted data signal, serial data consisting of first data, second data, and a parity, the second data having the same content as the first data, the parity indicating that a number of logical 1s or logical 0s forming the first data and the second data is even or odd; and selecting regular data in such a manner that when the transmitted data signal is received, if the first data and the second data are compared with each other and judged to be coincident with each other from the comparison, then the coincident data is selected as the regular data without checking a logic of the parity and if the first data and the second data are judged to be different from each other from the comparison, then the logic of the parity is checked and if only one of the first data or the second data corresponds to the logic of the parity, then the data corresponding to the logic of the parity is selected as the regular data, otherwise the data is discarded.

2. A multiplex communication apparatus connecting a plurality of circuit units by means of a multiplex communication system, each of the circuit units comprising:

a first circuit outputting serial transmission data including first data, second data, and a parity, the second data having the same content as the first data and the parity indicating that a number of logical 1s or logical 0s forming the first data and the second data is even or odd; and a second circuit selecting regular data in such a manner that when the transmitted data signal is received, if the first data and the second data are compared with each other and judged to be coincident with each other, then the coincident data is selected as the regular data without checking a logic of the parity and if the first data and the second data are judged to be different from each other, then the logic of the parity is checked and if only one of the first data or the second data corresponds to the logic of the parity, then the data corresponding to the parity is selected as the regular data, otherwise the data is discarded.

3. A multiplex communication apparatus as claimed in claim 2, wherein the first and second data is comprised of at least two bits, respectively, and the parity is comprised of at least one bit.

4. A multiplex communication apparatus connecting a plurality of circuit units by means of a multiplex communication system, each of the circuit units comprising:

a first circuit outputting serial transmission data including first data, second data, and a parity, the second data having the same content as the first data and the parity indicating that a number of logical 1s or logical 0s forming the first data and the second data is even or odd, wherein said first circuit includes a first resistor, and a first switching transistor connected in series to said first resistor; and a second circuit selecting regular data in such a manner that when the transmitted data signal is received, if the first data and the second data are compared with each other and judged to be coincident with each other, then the coincident data is selected as the regular data without checking a logic of the parity and if the first data and the second data are judged to be different from each other, then the logic of the parity is checked and if only one of the first data or the second data corresponds to the logic of the parity, then the data corresponding to the parity is selected as the regular data, otherwise the data is discarded, wherein said second circuit includes a second resistor, a third resistor and a second switching transistor connected in series to said second resistor, said first, second and third resistors being connected to a signal line, said third resistor being connected to a power supply.

5. A multiplex communication apparatus connecting a plurality of circuit units by means of a multiplex communication system, each of the circuit units comprising:

a first circuit outputting serial transmission data including first data, second data, and a parity, the second data having the same content as the first data and the parity indicating that a number of logical 1s or logical 0s forming the first data and the second data is even or odd, wherein said first circuit includes a first resistor and a first switching transistor connected in series to said first resistor; and a second circuit selecting regular data in such a manner that when the transmitted data signal is received, if the first data and the second data are compared with each other and judged to be coincident with each other, then the coincident data is selected as the regular data without checking a logic of the parity and if the first data and the second data are judged to be different from each other, then the logic of the parity is checked and if only one of the first data or the second data corresponds to the logic of the parity, then the data corresponding to the parity is selected as the regular data, otherwise the data is discarded, wherein and said second circuit includes a second resistor, a current mirror circuit and a second switching transistor connected in series to said second resistor, said first and second resistors and said current mirror circuit being connected to a signal line, said current mirror circuit being connected to a power supply.

* * * * *